(12) United States Patent
Harada et al.

(10) Patent No.: US 11,906,062 B2
(45) Date of Patent: Feb. 20, 2024

(54) FLUID CONTROL DEVICE, JOINT BLOCK AND MANUFACTURING METHOD FOR FLUID CONTROL DEVICE

(71) Applicant: FUJIKIN INCORPORATED, Osaka (JP)

(72) Inventors: Akihiro Harada, Osaka (JP); Kenji Aikawa, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 197 days.

(21) Appl. No.: 17/312,232

(22) PCT Filed: Dec. 12, 2019

(86) PCT No.: PCT/JP2019/048642
§ 371 (c)(1),
(2) Date: Jun. 9, 2021

(87) PCT Pub. No.: WO2020/137572
PCT Pub. Date: Jul. 2, 2020

(65) Prior Publication Data
US 2022/0025986 A1    Jan. 27, 2022

(30) Foreign Application Priority Data
Dec. 27, 2018 (JP) .................................. 2018-244204

(51) Int. Cl.
*F16K 27/00* (2006.01)
*F15B 13/08* (2006.01)

(52) U.S. Cl.
CPC ........ *F16K 27/003* (2013.01); *F15B 13/0825* (2013.01)

(58) Field of Classification Search
CPC . F16K 27/003; F15B 13/0825; F15B 13/0821
See application file for complete search history.

(56) References Cited

U.S. PATENT DOCUMENTS 6,076,543 A * 6/2000 Johnson .................. C23C 16/54
                                                     137/884
6,868,867 B2 * 3/2005 Yamaji .................. F16K 27/003
                                                     137/884
(Continued)

FOREIGN PATENT DOCUMENTS

CN   102198609   9/2011
CN   102209855   10/2011
(Continued)

OTHER PUBLICATIONS

International Search Report, WIPO, Application No. PCT/JP2019/048642, dated Feb. 4, 2020, English translation.
(Continued)

*Primary Examiner* — Michael R Reid
(74) *Attorney, Agent, or Firm* — Greenblum & Bernstein, P.L.C.

(57) ABSTRACT

A fluid control device includes; upstream side and downstream side joint blocks defining a fluid flow path, and having engaging portions at a bottom surface side; a support member having a guide portion to which the engaging portions of the upstream side and downstream side joint blocks can be engaged; and a fluid device supported by the support member via the upstream side and the downstream side joint blocks; wherein the upstream side and the downstream side joint blocks are fixed to the guide portion by utilizing a reaction force against a bending force generated by the tightening force of fastening bolts to the upstream side and the downstream side joint blocks and the fluid device connected together, and the length of the engaging portions in the longitudinal direction of the joint blocks is formed shorter than the length of the joint blocks.

5 Claims, 17 Drawing Sheets

(56) References Cited

U.S. PATENT DOCUMENTS

| | | | |
|---|---|---|---|
| 8,973,615 B2* | 3/2015 | Hoshi | ............... F16K 27/003 248/225.11 |
| 2002/0031417 A1 | 3/2002 | Hoshi et al. | |
| 2011/0200276 A1 | 8/2011 | Bolzonaro | |
| 2011/0232120 A1 | 9/2011 | Tüllmann et al. | |
| 2019/0162323 A1 | 5/2019 | Aikawa et al. | |
| 2019/0195378 A1 | 6/2019 | Aikawa et al. | |

FOREIGN PATENT DOCUMENTS

| | | |
|---|---|---|
| JP | 2000-283157 | 10/2000 |
| JP | 2000-291653 | 10/2000 |
| JP | 2002-206700 A | 7/2002 |
| JP | 2008267428 A | 11/2008 |
| JP | 2014-234858 | 12/2014 |
| JP | 2015-175502 A | 10/2015 |
| WO | 2017/221891 A1 | 12/2017 |
| WO | 2017/221893 A1 | 12/2017 |

OTHER PUBLICATIONS

International Preliminary Report on Patentability, WIPO, Application No. PCT/JP2019/048642, dated Jun. 16, 2021.
Office Action, China Patent Office, in counterpart Chinese Patent Application No. 201980086426.4, dated Oct. 10, 2022 (with English translation).
Japanese Office Action in counterpart application No. JP2020-563058, dated Oct. 3, 2023.

* cited by examiner

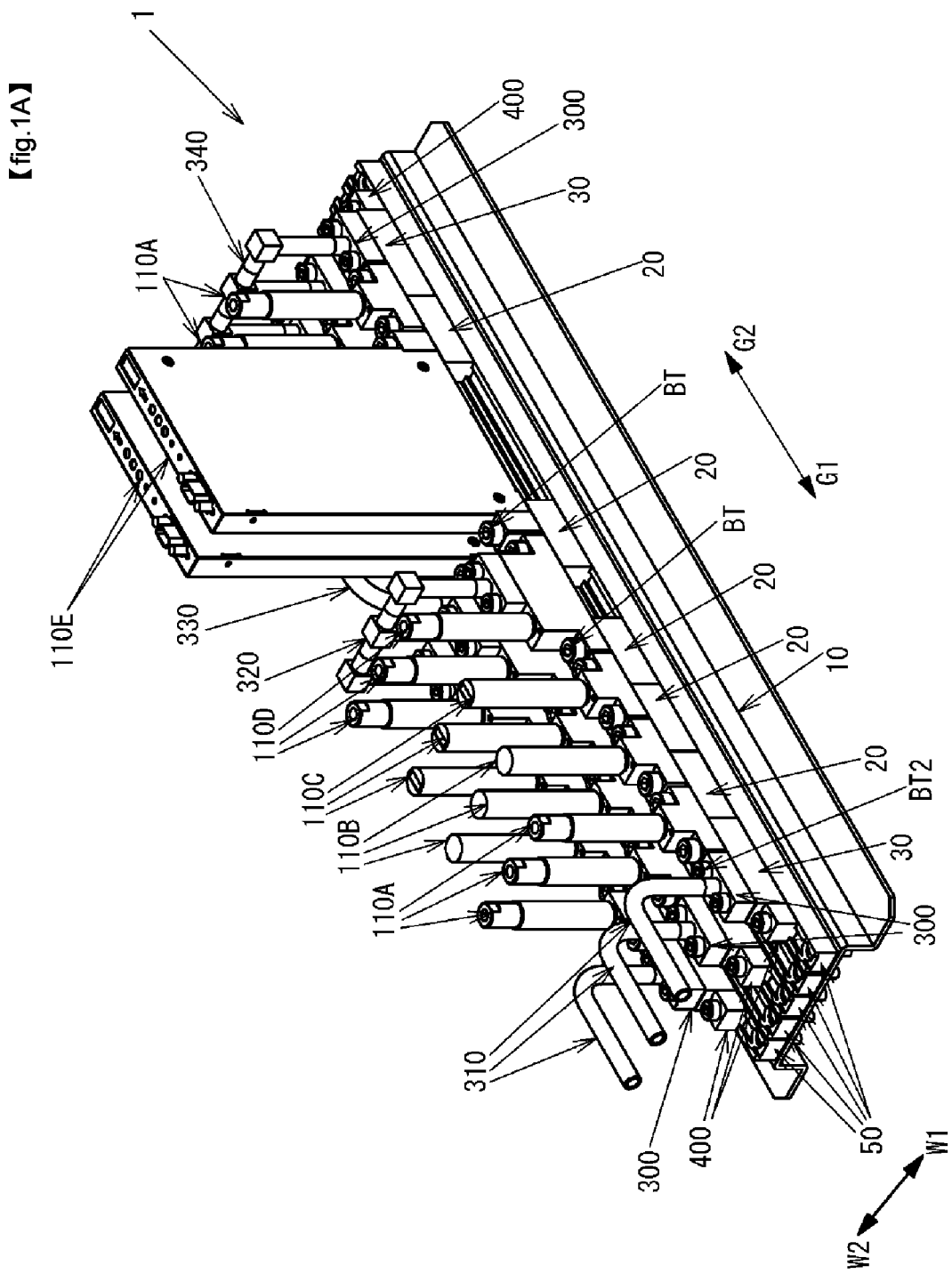
[fig.1A]

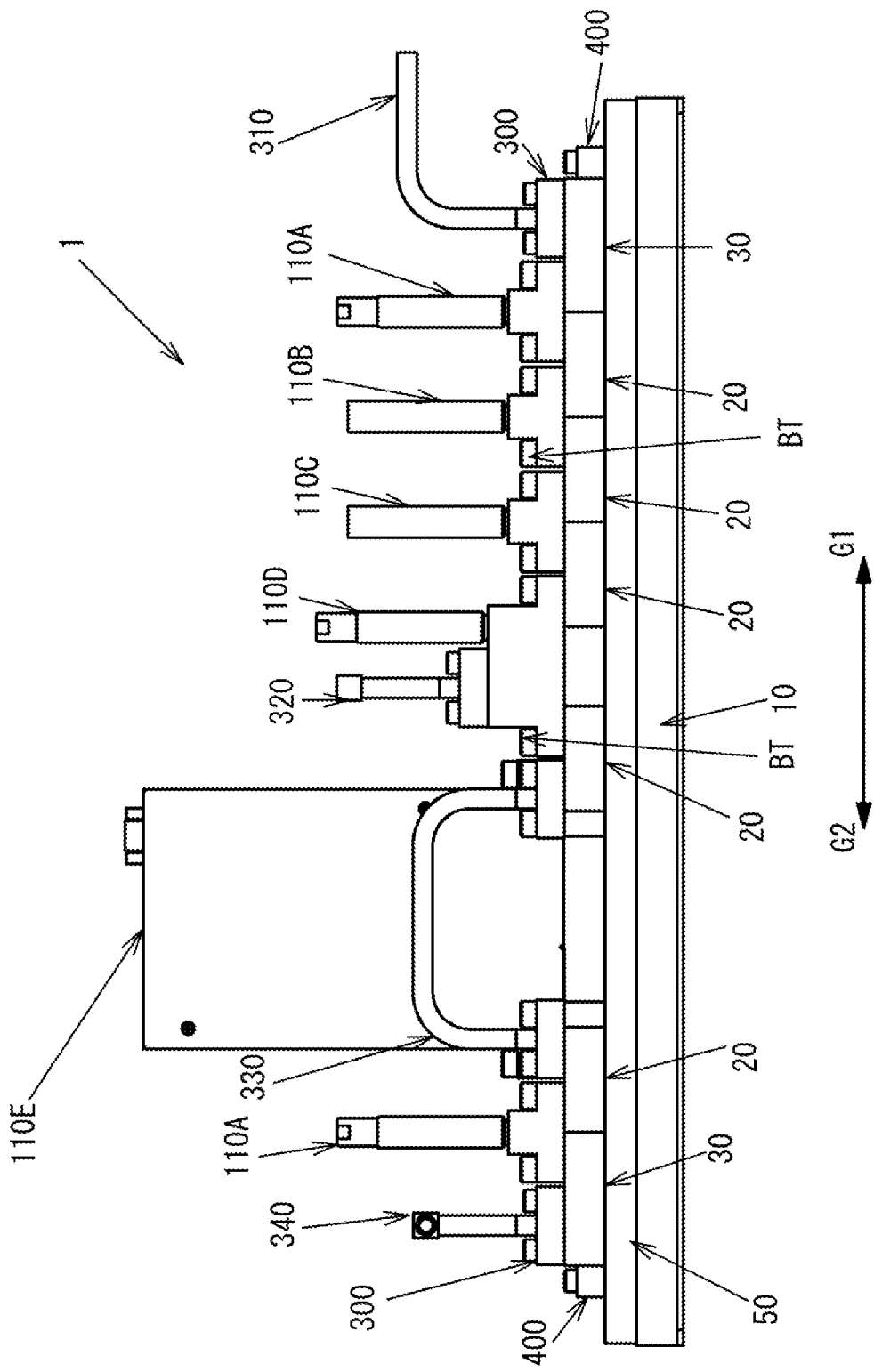
[fig.1B]

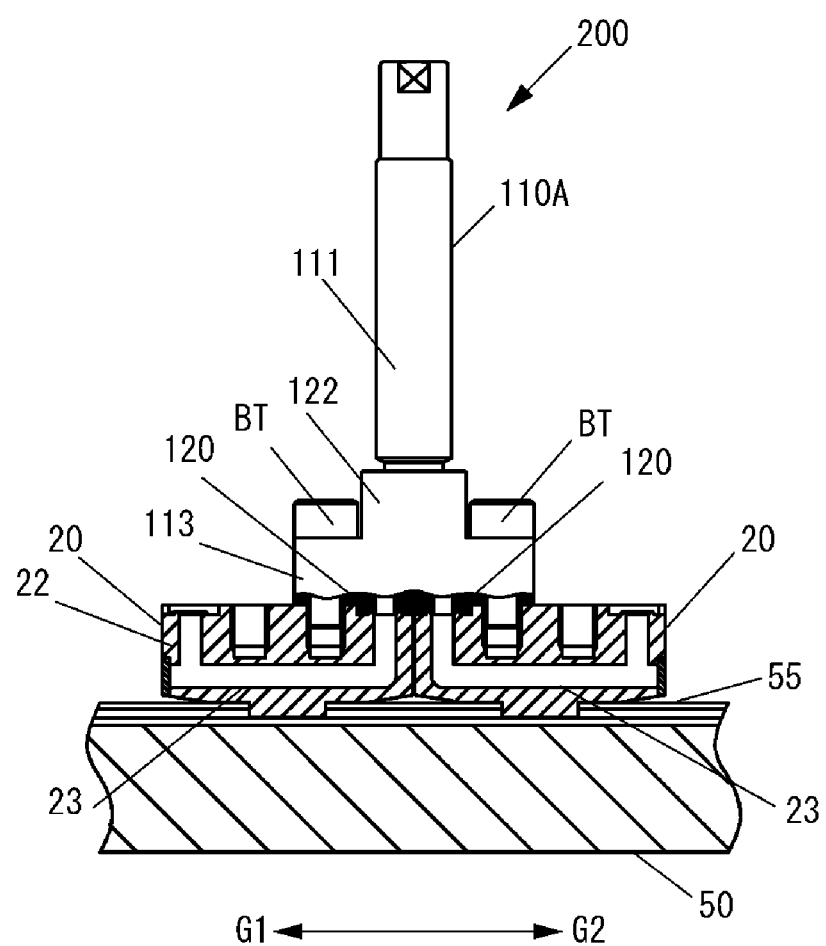
[fig.2]

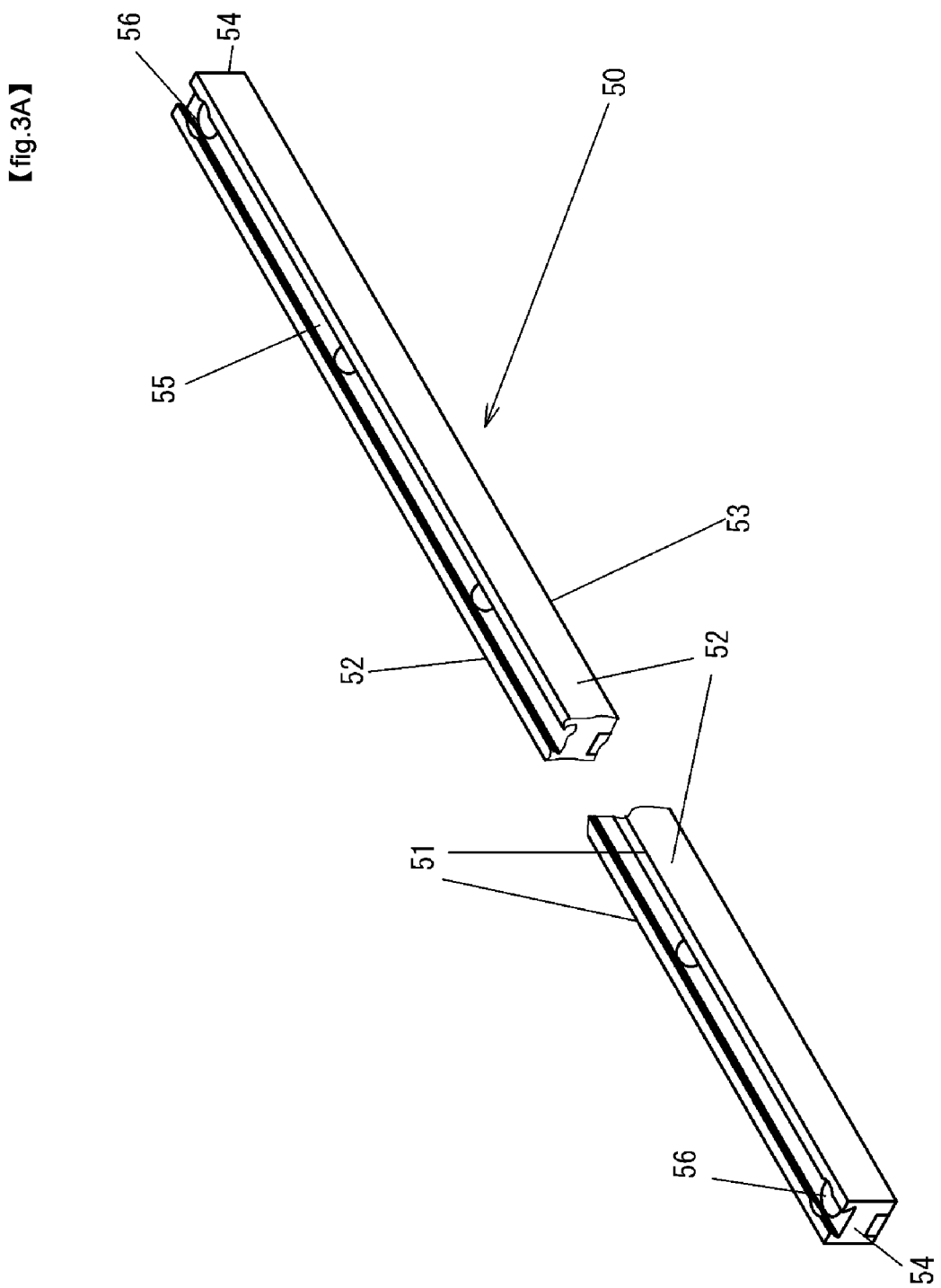

[fig.3B]
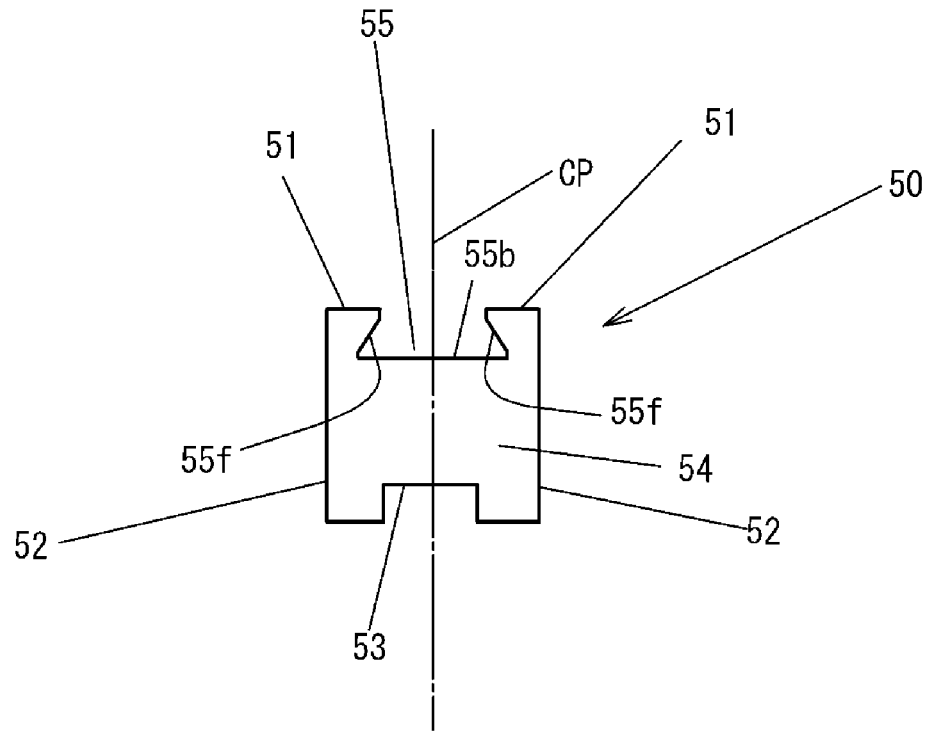
[fig.4A]
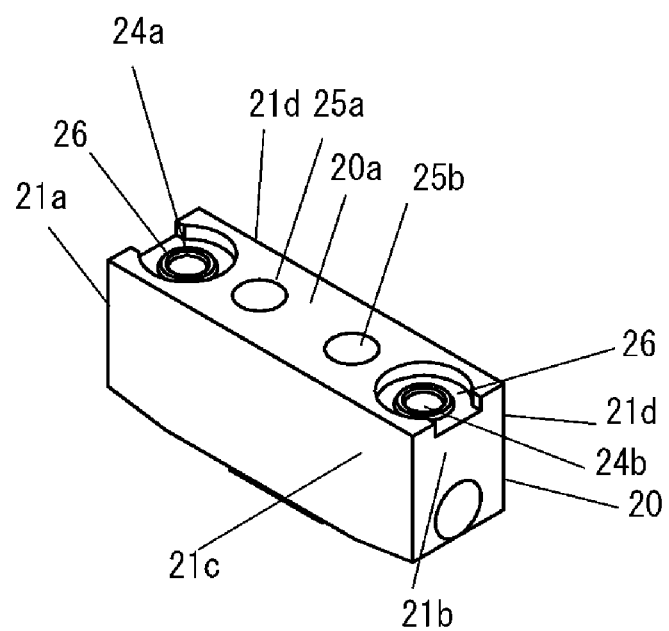

[fig.4B]
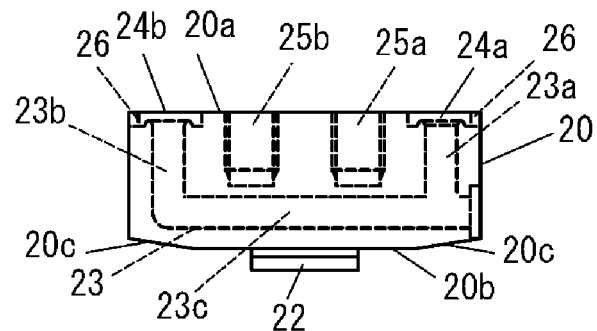
[fig.4C]
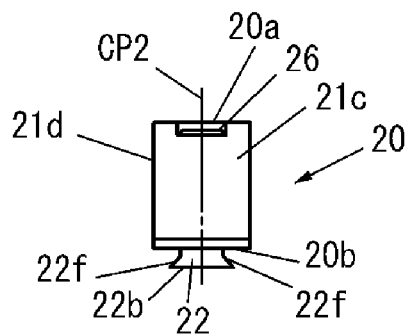
[fig.5A]
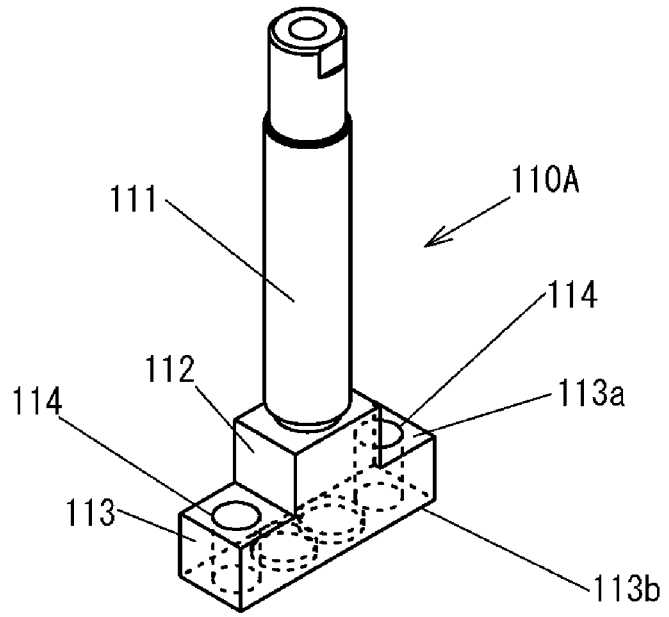

[fig.5B]
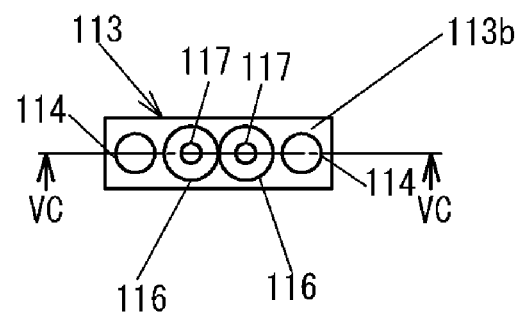
[fig.5C]
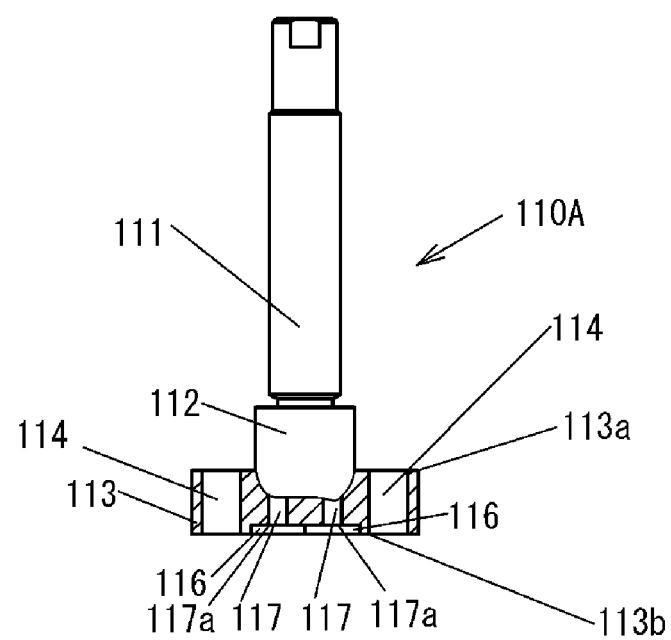

[fig.6A]
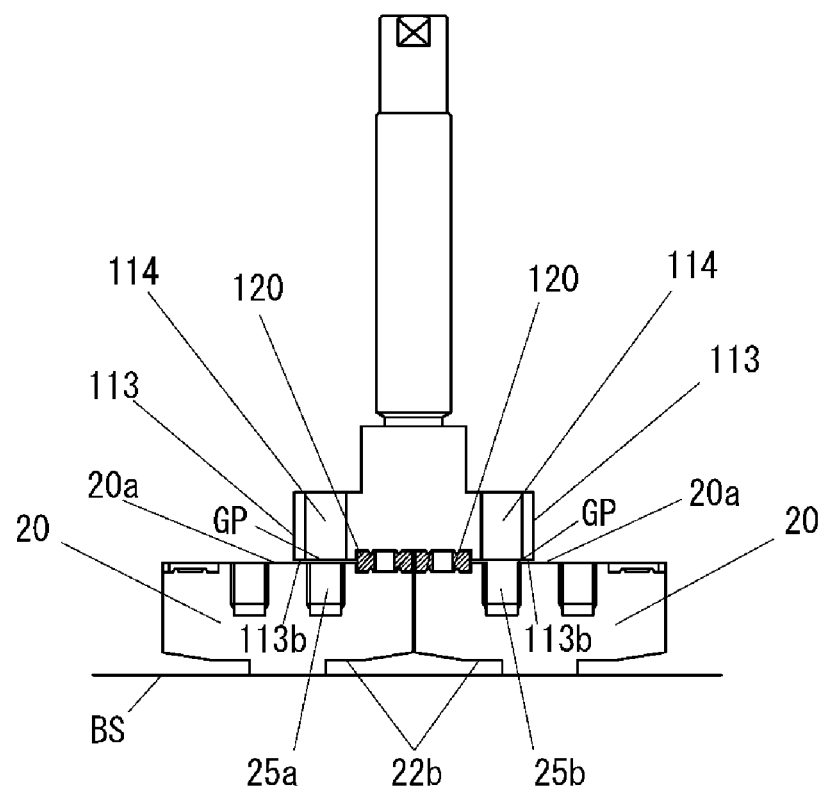
[fig.6B]
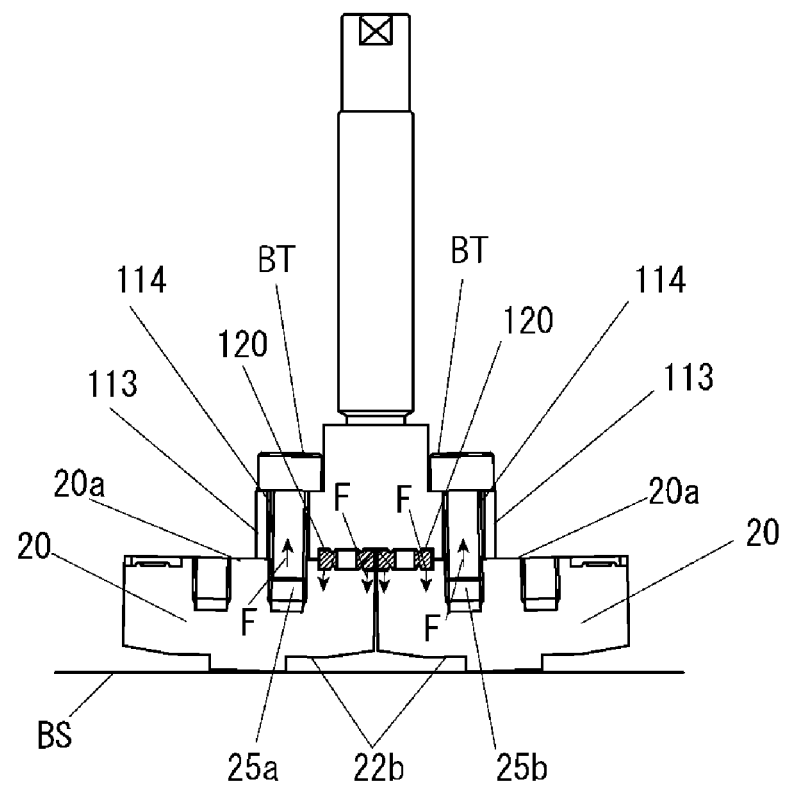

[fig.6C]
(a)
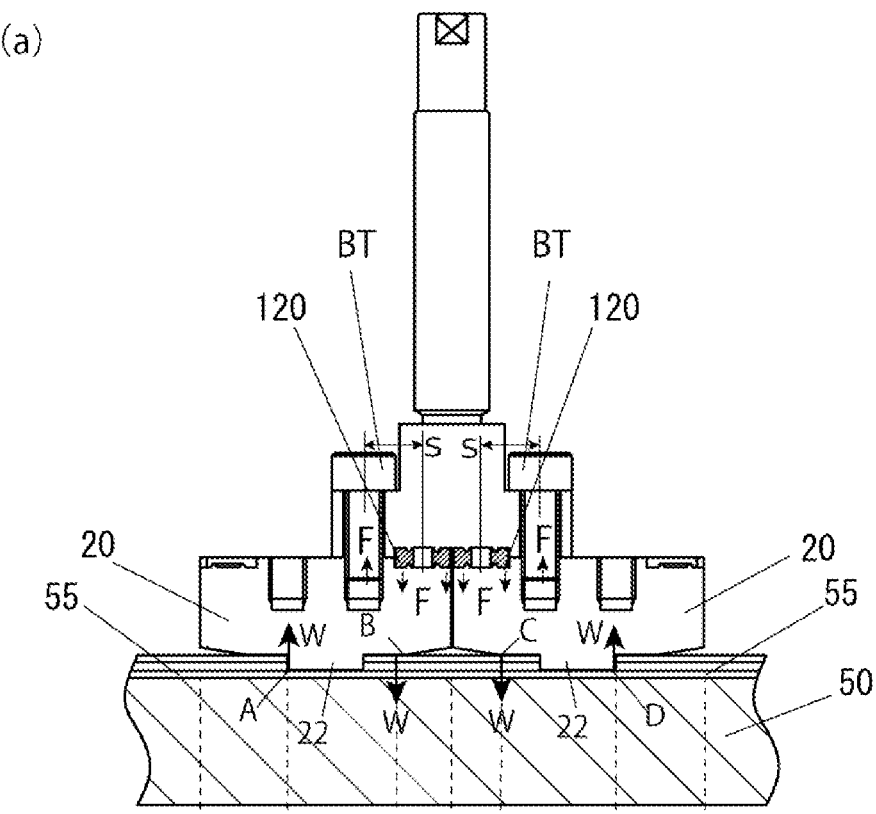
(b) Equivalent beam deflection model
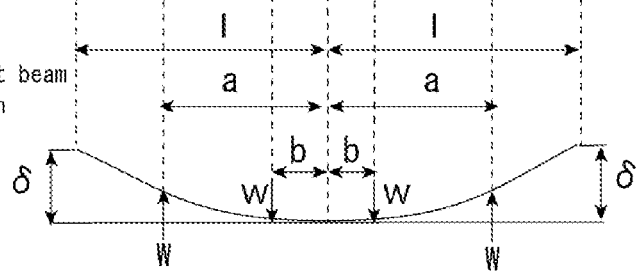
Deflection amount $\delta = \dfrac{W}{6EI}\{a^2(3l-a)-b^2(3l-b)\}$

[fig.7]
(a)
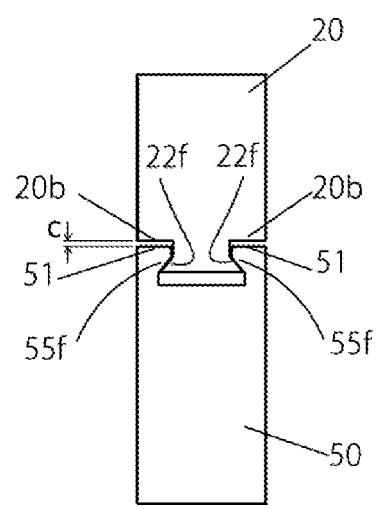
(b)
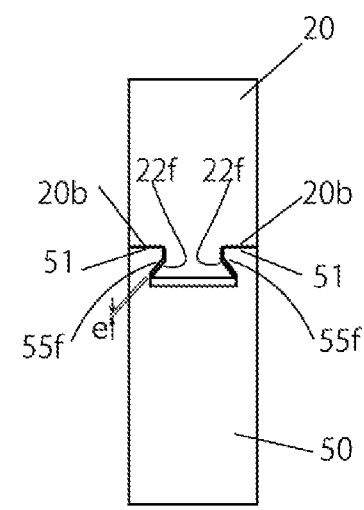

[fig.8]
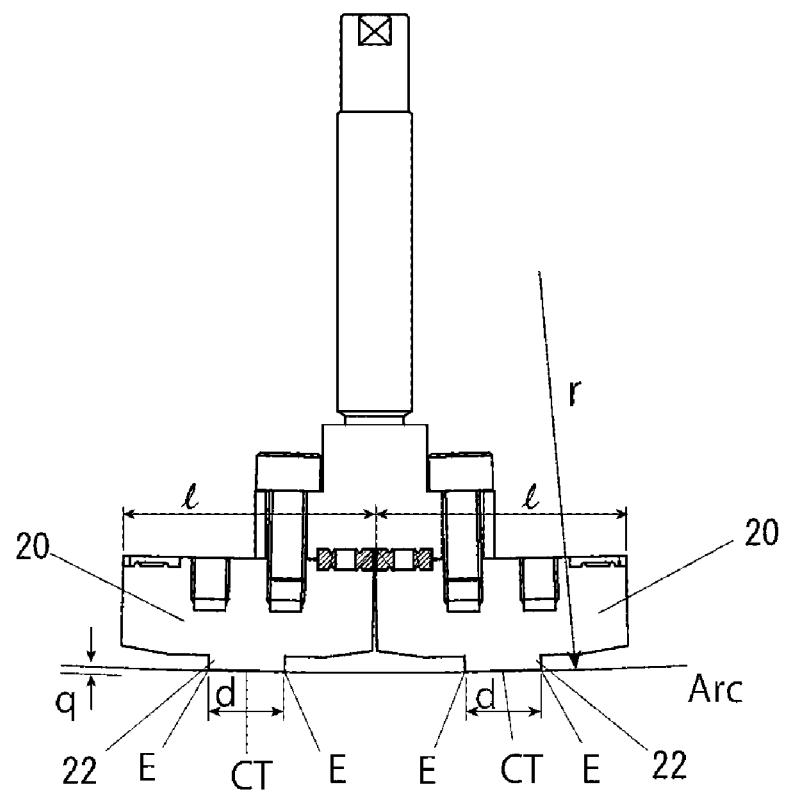

[fig.9A]
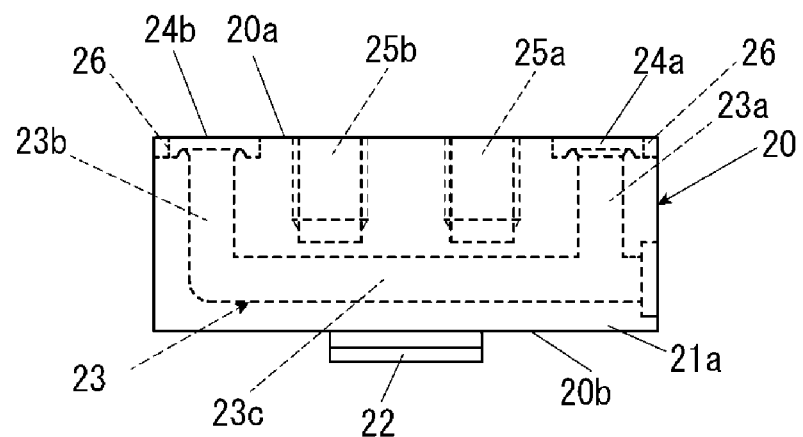

[fig.9B]
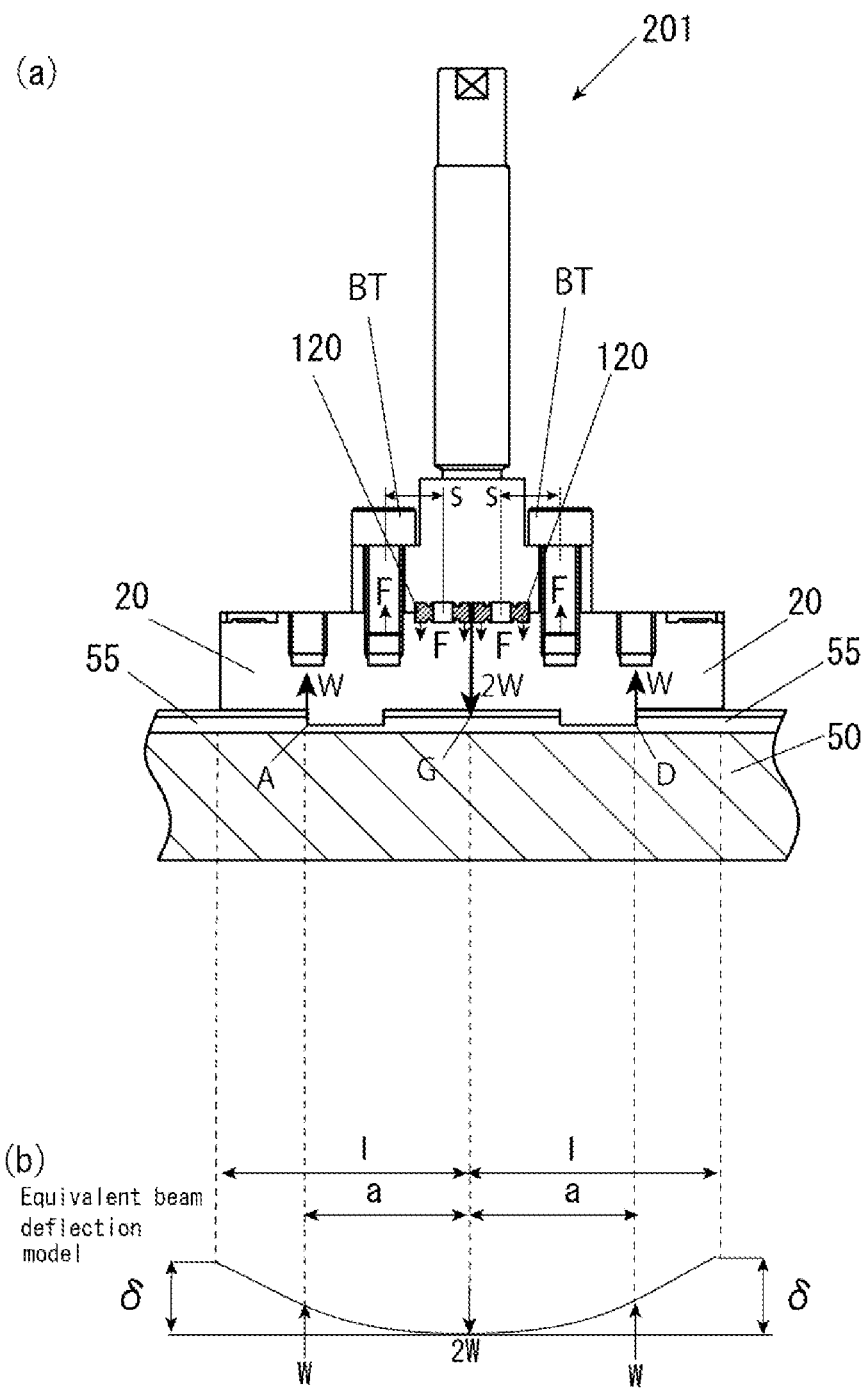

[fig.10A]
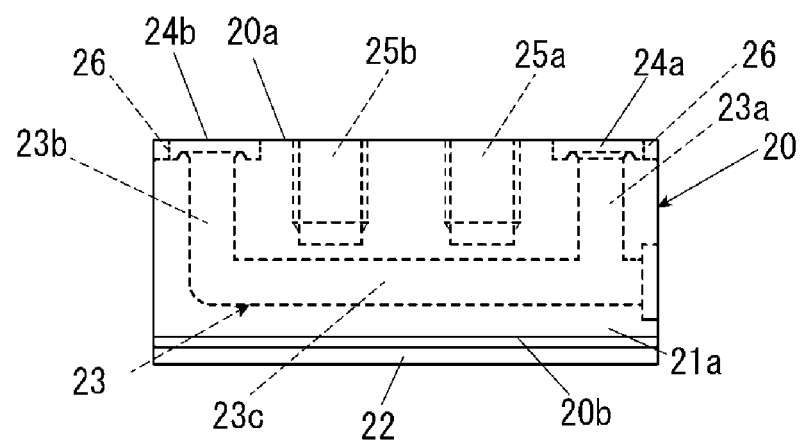

[fig.10B]
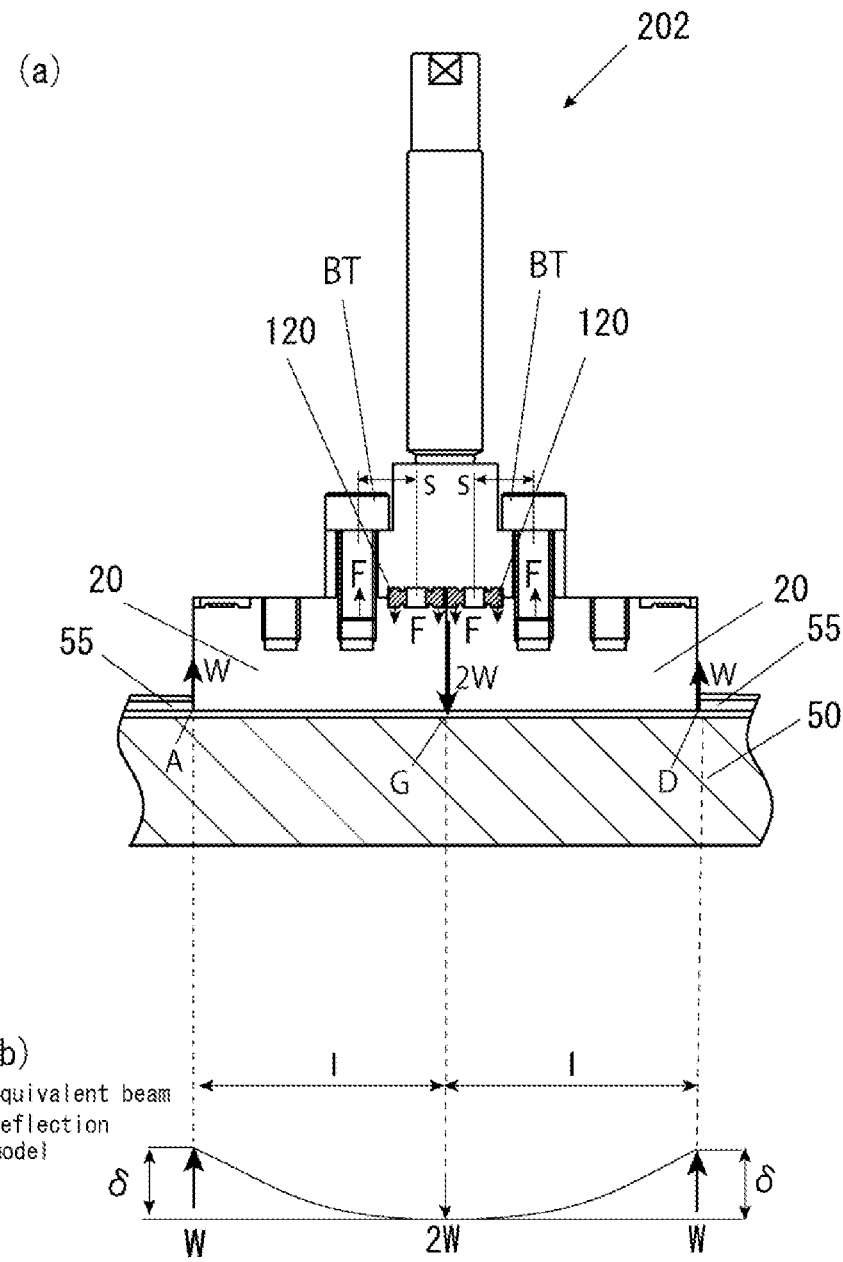

[fig.11A]
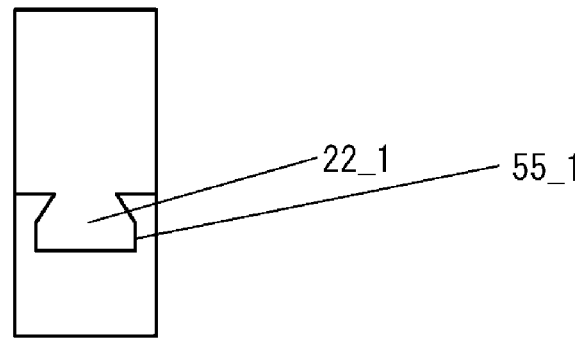
[fig.11B]
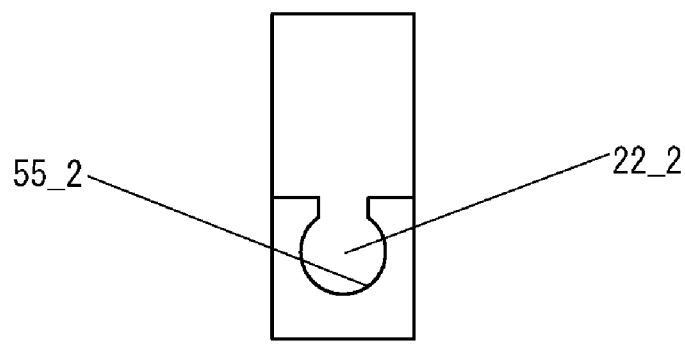
[fig.11C]
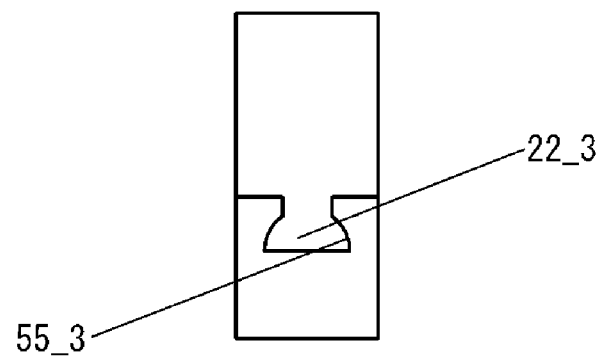

[fig.12A]
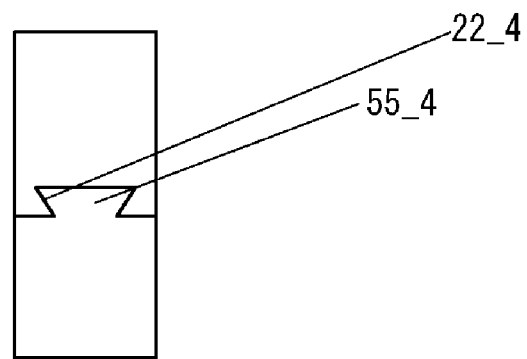
[fig.12B]
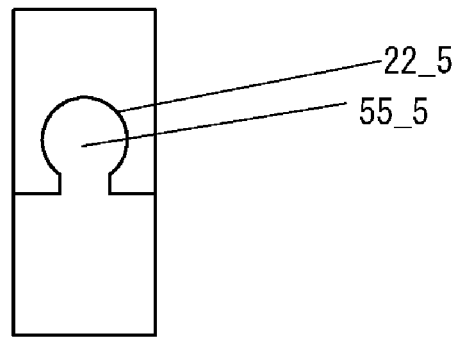

FLUID CONTROL DEVICE, JOINT BLOCK AND MANUFACTURING METHOD FOR FLUID CONTROL DEVICE

TECHNICAL FIELD

The present invention relates to a fluid control device in which a fluid device is integrated, a joint block, and a manufacturing method for fluid control device.

BACKGROUND ART

As a fluid control device used for supplying various kinds of process gases to e.g. a chamber of a semiconductor manufacturing apparatus, there have been known, for example, the devices disclosed in the following cited documents 1, 2.

In these fluid control devices, a plurality of joint blocks each having a fluid flow path inside are engaged with a support member that is a rail or the like fixed on a substrate, and the fluid devices are mounted on the joint blocks so as to straddle the neighboring joint blocks.

PATENT LITERATURE

PTL 1: Japanese Laid-Open Patent Application No. 2002-206700
PTL 2: Japanese Laid-Open Patent Application No. 2015-175502
PTL 3: International Publication No. WO2017/221893
PTL 4: International Publication No. WO2017/221891

SUMMARY OF INVENTION

Technical Problem

In the field of the fluid control device such as described above, higher responsiveness is required to control the supply of the process gas, and for this purpose, the fluid control device should be miniaturized and integrated as much as possible and installed closer to the chamber to which the fluid is supplied. Further, along with increase in the size of the object to be processed such as increase in the diameter of semiconductor wafers, the supply flow rate of the fluid supplied from the fluid control device into the chamber must be increased accordingly.

Further, when the fluid control device is miniaturized and integrated, the assembly operation becomes difficult and the assembly man-hours increase. In addition, the maintainability of the apparatus is deteriorated.

To address these issues, in Patent Literatures 3 and 4, the width dimension of the joint block or the like is reduced while ensuring the fluid flow path diameter by devising a positional relation with joint block's screw hole. In addition, the joint block is fixed to the rail member by utilizing a reaction force from the guide portion (rail member) against a bending force generated by a tightening force of fastening bolts that fasten the joint block and the fluid device connected to each other. As a result, since the joint blocks can be fixed to the rail members by simply bolting the bodies of the fluid devices to each joint block, the assembly man-hours are reduced.

However, in the above-mentioned mechanisms, there is a problem that the rail member deflects when tightening the body of the fluid device and the joint block to lock those devices. Due to the deflection of the rail member, there is a problem that the substrate to which the rail member is attached is deflected and the assembling ability is deteriorated.

In addition, when manufacturing the fluid control device, there is a case in which an assembly of the joint blocks and the fluid devices is assembled first and then the assembly is fitted into the rail member. At that time, if the assembly is slightly bent due to an assembly error, there is also a problem that the end portion of each joint block is easily caught by the engaging surface of the rail member.

An object of the present invention is to provide a fluid control device which solves the above-mentioned problem and realizes further miniaturization and integration without reducing the flow rate of the supplied fluids, and which solves the above-mentioned problem of deflection and the problem of assembling ability, and a manufacturing method of a fluid control device.

Solution to Problem

The fluid control device of the present invention comprises:
upstream side and downstream side joint blocks each having an upper surface and a bottom surface facing each other and side surfaces extending from the upper surface to the bottom surface side, the joint blocks each defining a fluid flow path, defining a flow path port of the fluid flow path which opens in the upper surface, and having an engaging portion at the bottom surface side;
a support member that extends linearly in a longitudinal direction and has a guide portion to which the engaging portions of the upstream side and downstream side joint blocks can be engaged; and
a fluid device supported by the support member via the upstream side and downstream side joint blocks;
wherein the guide portion restrains the upstream side and downstream side joint blocks on the support member while allowing the movement of the upstream side and downstream side joint blocks in a guiding direction,
the fluid device has a body defining a fluid flow path, and the body has a bottom surface at which two flow path ports open,
screw holes are formed toward the bottom surface side from the upper surface of the upstream side and downstream side joint blocks, the screw holes are adapted to be screwed with fastening bolts to connect the body to the upstream side and downstream side joint blocks while pressing seal members arranged around the flow path ports of the upstream side and downstream side joint blocks and the two flow path ports of the body, which are abutted against each other,
the screw hole of the upstream side joint block is formed only on the upstream side of the flow path port of the upstream side joint block in the longitudinal direction,
the screw hole of the downstream side joint block is formed only on the downstream side of the flow path port of the downstream side joint block in the longitudinal direction,
the upstream side and downstream side joint blocks are fixed to the guide portion by utilizing a reaction force against a bending force to the upstream side and downstream side joint blocks and the body connected together generated by a tightening force of the fastening bolts, and the length of the engaging portion in the longitudinal direction of the joint blocks is formed to be shorter than the length of the joint blocks.

The joint block of the present invention is a joint block defining an upper surface and a bottom surface facing each other, side surfaces extending from the upper surface toward the bottom surface side, and a fluid flow path, and having an engaging portion on the bottom surface side,
wherein two screw holes, each of which is connectable with another member, are formed from the upper surface toward the bottom surface side, and two screw holes are arranged between the two flow path ports in the longitudinal direction, and
the length of the joint block in the longitudinal direction is formed to be longer than the length of the engaging portion in the longitudinal direction.

The manufacturing method for a fluid device of the present invention is a manufacturing method of a fluid control device having the above-mentioned structure comprising;

a step of fixing the upstream side and downstream side joint blocks to the guide portion by utilizing a reaction force against a moment generated by the tightening force of the fastening bolts and acting on the upstream side and downstream side joint blocks and the fluid device connected together.

Advantageous Effects of Invention

According to the present invention, since the length of the engaging portion is formed to be shorter than the length of the joint block, when the body of the fluid device and the joint blocks are tightened, the span of action points of a force acting between them against a bending moment generated by reaction forces of the seal members becomes smaller, the tightening force of the fastening bolts required to obtain the same locking force becomes smaller, and it is possible to reduce the deflection of the rail member.

Further, since the length of the engaging portion is formed shorter than the length of the joint block, even if the assembly of the joint blocks and the fluid device is slightly bent, the amount of protrusion of the end portion of the engaging portion is reduced, less caught with the rail member occurs, and the assemble workability is improved.

Further, since the length of the engaging portion is made shorter than the length of the joint block, even if the tightening force of the fastening bolts is the same as before, the amount of bending over the entire rail member is reduced.

BRIEF DESCRIPTION OF DRAWINGS

FIG. 1A is an external perspective view of a fluid control device according to an embodiment of the present invention.

FIG. 1B is a back view of the fluid control device in FIG. 1A.

FIG. 2 is a partial cross-sectional view of an assembly which a portion of the fluid control device in FIG. 1A.

FIG. 3A is an external perspective view of a rail member.
FIG. 3B is a side view of the rail member of FIG. 3A.
FIG. 4A is an external perspective view of a joint block of the first embodiment.
FIG. 4B is a front view of the joint block in FIG. 4A.
FIG. 4C is a left side view of the joint block in FIG. 4A.
FIG. 5A is a perspective view of an open-close valve.
FIG. 5B is a bottom view of the body of the open-close valve in FIG. 5A.

FIG. 5C is a partial cross-sectional view of the body of the open-close valve in FIG. 5A.

FIG. 6A is a schematic diagram of an assembly of the first embodiment disposed on a reference surface without using the rail member.

FIG. 6B is a schematic diagram showing a state in which the assembly in FIG. 6A is tightened with fastening bolts.

FIG. 6C is a schematic diagram showing a state in which the assembly in FIG. 6A is tightened with fastening bolts using the rail member.

FIG. 7 is a schematic diagram showing engagement states of an engaging portion and a guide portion, wherein (a) shows a state subjected to upward force from the joint block, and (b) shows a state subjected to downward force from the joint block.

FIG. 8 is a schematic diagram showing the overhang amount of an end of each engaging portion when the assembly is bent.

FIG. 9A is a front view of a joint block of a second embodiment.

FIG. 9B is a schematic diagram showing a state in which the assembly of the second embodiment is tightened with fastening bolts.

FIG. 10A is a front view of a joint block of a comparative example.

FIG. 11B is a schematic diagram showing a state in which the assembly of the comparative example is tightened with fastening bolts.

FIG. 11A is a schematic diagram showing an example of a variation of the engaging portion and the guide portion.

FIG. 11B is a schematic diagram showing another example of a variation of the engaging portion and the guide portion.

FIG. 11C is a schematic diagram showing still another example of a variation of the engaging portion and the guide portion.

FIG. 12A is a schematic diagram showing still another example of a variation of the engaging portion and the guide portion.

FIG. 12B is a schematic diagram showing still another example of a variation of the engaging portion and the guide portion.

DESCRIPTION OF EMBODIMENTS

First Embodiment

Embodiments of the present invention will be described below with reference to the drawings.

Referring to FIGS. 1A to 10, a fluid control device according to a first embodiment of the present invention will be described in detail.

The first embodiment is a configuration in which the length of the engaging portion of each joint block is shorter than the total length of the joint block, and a relief portion is provided at both longitudinal ends of the bottom surface (supported surface) of the joint block.

As shown in FIGS. 1A and 1B, in the fluid control device 1, five rail members 50 extending in the longitudinal direction G1, G2 are arranged along the width direction W1, W2 is provided on the metallic base plate 10. Note that W1 represents the front side, W2 represents the back side, G1 represents the upstream side, and G2 represents the downstream side.

In the present invention, the number of the rail member(s) 50 to be attached to the base plate 10 is not limited to plural and it may be one, but the more the number is, the more the advantageous effects of the present invention becomes remarkable.

As shown in FIG. 1A, on each of the two rail members 50 arranged on the front side and the central portion, various fluid devices 110A~110E are installed through a plurality of joint blocks 20 and 30, and a flow paths through which a fluid flows from the upstream side toward the downstream side is formed by a plurality of joint blocks 20 and 30. On the rail member 50 on the rear side, fluid devices 110A~110D except for the fluid device 110E and the communication pipe 330 are installed through a plurality of joint blocks 20 and 30, and flow paths through which the fluid flows from the upstream side toward the downstream side is formed.

The term "fluid device" as used herein refers to a device used in a fluid control device for controlling the flow of fluids, comprising a body defining a fluid flow path and having at least two flow path ports opening at the bottom surface of the body. Specifically, an on-off valve (2-way valve) 110A, a regulator 110B, a pressure gauge 110C, an on-off valve (3-way valve) 110D, and a mass flow controller 110E or the like are included, but not limited to these.

An introduction pipe 310 is connected by a joint member 300 to an upstream flow path port of the two flow path ports (not shown) formed in the joint block 30. A seal member (not shown) is interposed between the joint member 300 and the joint block 30. Examples of the seal member include gaskets made of metal or resin.

Examples of the gasket include a soft gasket, a semi-metal gasket, and a metal gasket. Specifically, the following are suitably used.
(1) Soft Gasket
  Rubber O-ring
  Rubber seat (for full seating)
  Joint sheet
  Expanded graphite sheet
  PTFE sheets
  PTFE jacketed type
(2) Semi-Metal Gasket
  Spiral gasket (Spiral-wound gasket)
  Metal jacket gasket
(3) Metal Gasket
  Solid-metal flat gasket
  Metal hollow O-ring
  Ring joint By tightening two fastening bolts BT2 from both sides of the gasket (not shown), the gasket is pressed so that the joint member 300 and the joint block 30 are sealed. Since the configuration of the fluid flow path formed in the joint block 30 is the same as that of the joint block 20 to be described later, description thereof will be omitted here. A flow path port on the downstream side of the joint block 30 (not shown) is connected to the open-close valve 110A. The connection structure of this portion is the same as the connection structure of the joint block 20 with the fluid devices 110A~110E to be described later, and a detailed description thereof will be omitted.

Into flow paths of the three systems of the fluid control device 1, for example, a process gas such as ammonia gas is introduced through the introduction pipe 310 on the front side, a process gas such as hydrogen gas is introduced through the introduction pipe 310 in the central portion, and a purge gas such as nitrogen gas is introduced through the introduction pipe 310 on the back side. Three open-close valves (three-way valves) 110D are connected to each other by a communication pipe 320 so that the purge gas can be introduced into the flow paths of the process gas.

A communication pipe 330 is provided in the middle of the flow path of the purge gas instead of the mass flow controller 110E because the mass flow controller 110E is not required for the flow path system of the purge gas.

A supply pipe 340 connects the three joint members 300 arranged on the downstream side and is connected to a processing chamber (not shown).

At each of the upstream and downstream ends of the front side, the central portion and the rear side, a stopper 400 is fixed to the bottom surface of s guide portion 55 (see FIG. 3) by a fastening bolt BT2, and the movement of the fluid devices 110A~110E connected to each other in the respective flow path system in the longitudinal G1, G2 is restricted. The fixed position of the stopper 400 can be appropriately changed and adjusted according to the number of fluid devices or the like.

FIG. 2 is a partial cross-sectional view illustrating an assembly 200 constituting a part of the flow path of one system of the fluid control device 1.

The assembly 200 includes a rail member 50, upstream and downstream joint blocks 20, 20 arranged on the rail member 50, and an open-close valve 110A as a fluid device arranged on the joint blocks 20, 20. Further, between the body 113 of the open-close valve 110A and the upstream and downstream joint blocks 20, 20, gaskets 120,120 as seal members are provided. Further, the assembly 200 has two fastening bolts BT for connecting the body 113 of the open-close valve 110A to the upstream and downstream joint blocks 20, 20.

FIG. 3A and FIG. 3B are views showing the rail member 50, FIG. 3A is an external perspective view and FIG. 3B is a side view.

The rail member 50 is, for example, a long member made of a metal such as a stainless steel alloy, and has a cross section formed in a rectangular shape, and defines an upper surface 51, two side surfaces 52 perpendicular thereto, a bottom surface 53 parallel to the upper surface 51 and orthogonal to the side surfaces 52 and both end faces 54 in the longitudinal direction. On the upper surface 51, a guide portion 55 formed in a groove shape in the longitudinal direction extends. The guide portion 55, as shown in FIG. 3B, is formed symmetrically with respect to the imaginary central plane CP extending longitudinally through the central position of the upper surface 51 and the bottom surface 53 of the rail member 50, and the guide portion 55 has a bottom surface 55b and two receiving surfaces 55f which are inclined diverging toward the bottom surface 55b. The two receiving surfaces 55f are inclined in opposite directions. The receiving surfaces 55f are inclined at an angle of about 57 degrees with respect to the bottom surface 55b, but is not limited thereto. The upper surface 51 of the rail member 50 functions as a support surface capable of supporting joint blocks 20, 30, and the stopper 400. A through hole 56 for fastening bolts for fixing the rail member 50 to the base plate 10 is formed at both ends in the longitudinal direction of the bottom surface 55b of the guide portion 55. With respect to the dimensions of the rail member 50, the width and height are about 10 mm, and the total length is about 300 mm, but they are not limited thereto. The stopper 400 can be fixed to any position in the longitudinal direction of the guide portion 55 by a fastening bolt BT2, but a well-known fastening structure can be adopted, and therefore, detailed explanation thereof is omitted.

FIG. 4A to FIG. 4C are diagrams showing the joint block 20 of the first embodiment, FIG. 4A is an external perspective view, FIG. 4B is a front view, and FIG. 4C is a left side view.

The joint block 20 is a member made of metal such as a stainless steel alloy, and has a flat upper surface 20a and a flat bottom surface 20b facing each other, and four side surfaces 21a, 21b, 21c, and 21d each perpendicular to the upper surface 20a. Of the four side surfaces 21a, 21b, 21c, 21d, adjacent two side surfaces are orthogonal to each other. The side surfaces 21a, 21b are planes located at both ends in the longitudinal direction, and the side surfaces 21c, 21d are planes extending in the longitudinal direction. Incidentally, the joint block 20 may have other shapes although exemplified in the case of a rectangular parallelepiped shape.

The bottom surface 20b functions as a supported surface supported by the upper surface 51 of the rail member 50, the engaging portion 22 is integrally formed so as to protrude from the bottom surface 20b. The engaging portion 22 is formed in a divergent shape downward from the bottom surface 20b, and has engaging surfaces 22f which are inclined in opposite directions to each other. The engaging portion 22 is formed symmetrically with respect to the imaginary central plane CP2, the inclination angle of the engaging surfaces 22f with respect to the bottom surface 22b is substantially the same angle as the receiving surfaces 55f of the rail member 50, but is not limited thereto. The engaging portion 22 has a shape to be fitted to the guide portion 55 of the rail member 50, and can be inserted from any of both ends in the longitudinal direction of the rail member 50. The guide portion 55 restrains the joint block 20 on the rail member 50 while allowing longitudinal movement of the engaging portion 22. From the viewpoint of machining and assembly, there is a backlash of a predetermined tolerance range between the engaging portion 22 and the guide portion 55, but the backlash is set within a range in which the lock mechanism to be described later reliably functions.

In the present embodiment, the length of the engaging portion 22 in the longitudinal direction of the joint block 20 is formed to be shorter than the length of the joint block 20. Thus, when the joint block 20 and the rail member 50 are locked by the moment generated when fastening the joint block 20 with the body 113 of the fluid device 110A, the engaging surfaces 22f of the engaging portion 22 located on the inner portion than the longitudinal end of the joint block 20 come into contact with the receiving surfaces 55f of the rail member 50.

Further, in the present embodiment, the bottom surface 20b of the joint block 20 has relief portions 20c at both ends in the longitudinal direction. When the joint block 20 and the rail member 50 are locked by the moment generated when fastening the joint block 20 with the body 113 of the fluid device 110A, and due to the relief portions 20c, portions inside the ends of bottom surface 20b of joint block 20 come into contact with the upper surface 51 of the rail member 50 which is a support surface. In the present embodiment, the relief portions 20c are each a tapered surface retracted inwardly from the bottom surface 20b. However, the relief portion 20c is not limited to the tapered surface, and it may be a stepped surface or a curved surface that retracts from the bottom surface 20b to the inside.

The fluid flow path 23 defined by the joint block 20 comprises: a first vertical flow path 23a extending from the upper surface 20a toward the bottom surface 20b side and having a flow path port 24a opening at the upper surface 20a; a second vertical flow path 23b extending from the upper surface 20a toward the bottom surface 20b side and having a flow path port 24b opening at the upper surface 20a at a position spaced apart from each other in the longitudinal direction; and a horizontal flow path 23c extending longitudinally linearly inside the joint block 20 and connected to the first and second vertical flow paths 23a, 23b.

Holding recesses 26, 26 for holding the gaskets 120 are formed around the flow path ports 24a, 24b that open at the upper surface 20a of the joint block 20.

The joint block 20 has, in the longitudinal direction, two screw holes 25a, 25b that open at the upper surface 20a and extend toward the bottom surface 20b. The screw holes 25a, 25b are located between the two flow path ports 24a, 24b opened at the upper surface 20a. The dimensions of the joint block 20 are, for example, a width of about 10 mm, a length of about 30 mm, a diameter of the fluid flow path 23 of about 2.6 mm, and a height is about 13 mm, but is not limited thereto. The widths of the joint block 20 and the rail member 50 are about 10 mm and they are substantially matched.

The screw hole 25a is formed only on one side with respect to the flow path port 24a in the longitudinal direction of the joint block 20. With such a configuration, the gasket 120 that seals the periphery of the flow path port 24a can be crushed by the fastening force of one fastening bolt BT, and it is possible to connect the joint block 20 and the body 113 of the open-close valve 110A. Consequently, the width of the joint block 20 can be significantly reduced. Similarly, the screw hole 25b is not on the side surface 21a side but on the side surface 21a side with respect to the flow path port 24b, and is formed only on one side with respect to the flow path port 24b. With such a configuration, a single fastening bolt BT can crush the gasket 120 that seals the periphery of the flow path port 24b, and can connect the joint block 20 and body 113 of another fluid device.

FIG. 5A to FIG. 5C are diagrams showing an open-close valve (fluid device) 110A, FIG. 5A is a perspective view, FIG. 5B is a bottom view, and FIG. 5C is a partial cross-sectional view of FIG. 5B in the VC-VC line direction. The open-close valve 110A includes an actuator built-in portion 111, a valve built-in portion 112 and the body 113, and is supported by the rail member 50 via the joint block 20.

The width of the body 113 is matched to the width of the joint block 20 and is, for example, about 10 mm, but not limited thereto.

The body 113 defines a fluid flow path 117 having two flow path ports 117a open on bottom surface 113b side, and two flow path ports 117a are formed with holding recesses 116 for holding gaskets 120, respectively.

At both longitudinal ends of the body 113, through holes 114 for inserting fastening bolts BT are formed from the upper surface 113a toward the bottom surface 113b.

The gasket 120, although not shown, is formed into a substantially washer shape having a thickness.

The gasket can be formed of the same material as the body 113 such as a stainless steel alloy, but needs to be heat treated so that the hardness is sufficiently lower than that of the body 113. other than gaskets made of metal material, it is also possible to use gaskets made of resin.

Now, the locking mechanism of the present invention will be described.

In the present embodiment, the locking mechanism includes two receiving surfaces 55f of the guide portion 55 of the rail member 50 and two engaging surfaces 22f of the engaging portion 22 of the joint block 20.

FIG. 6A shows a condition in which two joint blocks 20 and 20 are placed on a reference surface BS instead of the rail member 50, gaskets 120 are placed at predetermined positions, and a body 113 of an open-close valve 110A as a fluid device is placed on them.

In this condition, since the gaskets 120 are not pressurized, a substantially constant gap GP is formed between the bottom surface 113b of the body 113 and the upper surface 20a of the two joint blocks 20.

Then, as shown in FIG. 6B, when screwing the fastening bolts BT through the through holes 114 of the body 113 to the screw holes 25a, 25b of the upstream side and downstream side joint block 20, 20, the pulling forces in the direction indicated by the arrows F, F act to the upstream side and downstream side joint blocks 20, 20, and the downward forces indicated by the arrows F, F from the gasket 120,120 act. Thus, a clockwise moment is applied to the upstream joint block 20 in the figure, and a counterclockwise moment is applied to the downstream joint block 20 in the figure. FIG. 6B shows how the joint block is rotationally displaced due to these moments with exaggeration.

FIG. 6C (a) shows a state in which the engaging portions 22, 22 of the upstream and downstream joint blocks 20, 20 are inserted into to the guide portion 55 of the rail member 50 and the fastening bolts BT are tightened in the same manner as in FIG. 6B.

At this time, the clockwise moment applied to the joint block 20 of the upstream side (left side in the drawing) is applied to the rail member 50 restraining the rotational direction of the displacement of the joint block 20, an upward force W is applied to the point A corresponding to the left end of the engaging portion 22, and a downward force W is applied to the point B corresponding to the innermost portion of the right relief portion 20c, respectively.

Similarly, the counterclockwise moment applied to the joint block 20 on the downstream side (right side in the drawing) is applied to the rail member 50 restraining the displacement in the rotational direction of the joint block 20, an upward force W is applied to the point D corresponding to the right end of the engaging portion 22, and a downward force W is applied to the point C corresponding to the innermost portion of the left relief portion 20c, respectively.

FIG. 7 is a sectional view showing a state in which the engaging portion of the rail member 50 and the joint block 20 is engaged.

FIG. 7(a) shows a state at points A and D (see FIG. 6C) to which an upward force W is applied. At this time, while a predetermined gap c is present between the upper surface 51 of the rail member 50 (support surface) and the bottom surface 20b of the joint block 20 (supported surface), the receiving surfaces 55f of the rail member 50 are in contact with the engaging surfaces 22f of the joint block 20 and receive an upward force W.

On the other hand, FIG. 7 (b) shows a state at points B and C (see FIG. 6C) to which a downward force W is applied. At this time, while the gap e is present between the engaging surfaces 22f of the rail member 50 and the receiving surfaces 55f of the joint block 20, the upper surface 51 of the rail member 50 (support surface) is in contact with the bottom surface 20b of the joint block 20 (supported surface) and receives a downward force W.

With the action of these forces W, joint blocks 20, 20 are locked against the rail member 50.

The deflection of the rail member 50 caused during this locking will be discussed.

FIG. 6C (b) shows a model of a deflection of the beam equivalent to the rail member 50 in FIG. 6C (a).

Downward forces W are applied to points B and C of the rail member 50, and upward force W is applied to points A and D, respectively. Assuming that the length of each joint block 20 is 1 and the distances from the center of the assembly to points A (or D) and B (or C) are a and b, respectively, the deflection amount δ of the rail member 50 at both end positions of the joint block 20 is expressed by the following equation.

[Equation 1]

$$\delta = \frac{W}{6EI}\{a^2(3l-a) - b^2(3l-b)\}. \quad (1)$$

Here, E is Young's modulus, I is the second moment of cross section.

Therefore, the smaller the difference between a and b, the smaller the deflection amount δ.

For example, when a=0.7, b=0.15, δ becomes about δ=0.54 (Wl³/3EI) that is as small as 0.54 times the deflection amount (Wl³/3 EI) of the conventional structure described later when the value of W is controlled to a predetermined value required for locking.

On the other hand, the fastening force F of the fastening bolt BT required to obtain the above W will be discussed.

With respect to the joint block 20, the moment generated by the fastening force F of the fastening bolt BT and the reaction force of the gasket (equal to F) is equal to the moment applied from the rail member 50. Accordingly, when the distance between the fastening bolt BT and the center of the gasket 120 is taken as s, a relationship of F=W(a−b)/s holds.

In the structure of the present embodiment, for example, when s=0.23, a=0.7, and b=0.15, the necessary fastening force F is about F=2.3 W. This is as small as 0.54 times the fastening force F=4.3 W of the conventional structure (s=0.23, a=1, b=0) described later.

Therefore, in the present embodiment, with a small fastening force F, the required locking force W is obtained, and the deflection amount δ is also reduced.

The effect of reducing the deflection amount δ is increased as the span (a−b) of the action point of the force W is decreased by shortening the length of the engaging portion of the joint block 20 and increasing the relief portion of the bottom surface. However, if the span (a−b) is too small, even if the fastening bolt BT is tightened, the displacement of the joint block 20 in the direction toward and away from the rail member 50 at each action points becomes small, and the displacement may become insufficient to exceed the gap c (see FIG. 7 (a)) to activate the lock.

Therefore, the reduction amount of the engaging portion of the joint block 20 and the size of the relief portion of the bottom surface should be set to appropriate amounts, or the gap c (see FIG. 7 (a)) should be as small as possible.

Incidentally, in the model of the deflection of the beam, with respect to the rail member 50 engaged with the assembly 200 including the fluid device (open-close valve) 110A and the joint blocks 20, 20 on the upstream and downstream sides thereof, the deflection amount δ of the rail member 50 at both end positions of the joint blocks 20, 20 (also referred to as "deflection amount δ per unit assembly") was examined. However, in the actual fluid control device, additional fluid devices 110A and the like are connected to both sides of the upstream and downstream joint blocks 20, 20, and further joint blocks 20, 20 and the like are connected to the outside thereof, and the configuration of the assembly 200 is continuously repeated in half-overlapped manner. Therefore, it is difficult to calculate the amount of deflection at both end positions of the rail member 50 in the actual fluid control device, but if the amount of deflection δ per unit assembly is large, it is considered that the amount of deflection at both end positions of the rail member 50 also increases. Therefore, the deflection amount δ per unit assembly will also be examined in the embodiment and the comparative example described later in the same manner as the above embodiment.

Next, in the present embodiment, the assemble workability when the assembly 200 consisting of the joint blocks 20 and the fluid device 110A is assembled in advance and then fitted into the rail member 50 will be discussed.

As shown in FIG. 8, we consider a case where the assembly is bent into a polygonal shape circumscribing an arc Arc having a radius of curvature r due to an assembly error. It is assumed that the polygon is a polygon connecting each end E in the longitudinal direction of the engaging portion 22 of each joint block 20 that is easily caught, and the polygon circumscribes the arc Arc at the longitudinal center CT of the bottom surface of each engaging portion.

Assuming that the length of the engaging portion 22 is d, the overhang amount q of the end portion E of each engaging portion 22 is approximated by $q=d^2/8r$.

In this embodiment, since d=0.4*l (l is the length of the joint block), the overhang amount q becomes $q=0.16*l^2/2r$, that is as small as 0.16 times the conventional example described later (d=1*l). Therefore, when inserting the assembly to the rail member, it becomes less likely to catch, thereby improving the assemble workability.

Second Embodiment

In the second embodiment, as shown in FIG. 9A, it is a form in which the length of the engaging portion 22 of each joint block 20 is shorter than the total length of the joint block 20, and no relief portion is provided at the longitudinal ends of the supported surface (bottom surface 20b) of the joint block 20.

This embodiment is the same as the first embodiment except that the relief portion is not provided at both longitudinal ends of the supported surface (bottom surface 20b) of the joint block 20, and detailed description of the common portion will be omitted.

FIG. 9B (a) is a partial cross-sectional view showing an assembly 201 using the joint block 20 of the present embodiment. When the two joint blocks 20, 20 are engaged with the rail member 50 and the fastening bolts BT with the fluid device are tightened, as in the first embodiment, the fastening force F of the fastening bolt and the reaction force of the gasket (equal to F) generate a moment that tries to rotate the joint blocks 20, 20 in opposite directions to each other, and this moment is applied to the rail member 50. In the present embodiment, this moment is applied as upward forces W to the points A and D of the rail member 50 corresponding to the distal ends of the engaging portion 22, and applied as a downward force 2 W to the point G (center of the assembly) where the ends of the bottom surface 20b of the left and right joint blocks 20 abut against each other.

With the action of these forces W, the joint blocks 20, 20 are locked against the rail member 50.

The deflection of the rail member 50 caused during this locking is discussed.

FIG. 9B (b) shows a model of deflection of the beam equivalent to the rail member 50 in FIG. 9B (a).

Assuming that the length of each joint block 20 is l and the distance from the center to the point A or D is a, the deflection amount δ of the rail member 50 at both end positions of the joint block 20 is expressed by the following equation. (Equation 2 corresponds to the case where b=0 in Equation 1.)

[Equation 2]

$$\delta = \frac{Wa^2}{6EI}(3l - a). \quad (2)$$

Here, E is Young's modulus, and I is the second moment of cross section.

Therefore, the smaller a, the smaller the deflection amount δ.

For example, if a=0.7, δ becomes about $\delta=0.56(Wl^3/3EI)$ that is as small as 0.56 times the deflection amount $(Wl^3/3EI)$ of the conventional structure to be described later when W is controlled to a predetermined value required for locking.

On the other hand, the fastening force F of the fastening bolt BT required to obtain the above W will be discussed.

Since the moment generated by the fastening force F of the fastening bolt BT and the reaction force of the gasket 120 (equal to F) is equal to the moment applied to the rail member 50, a relation of F=Wa/s is established when the distance between the fastening bolt BT and the center of the gasket 120 is s.

In the structure of the present embodiment, for example, when s=0.23 and a=0.7, the fastening force F is about 2.9 W. This is as small as about 0.67 times the fastening force F=4.3 W of the conventional structure (s=0.23, a=1) described later.

In the present embodiment, assemble workability when the assembly of the joint block and the fluid device in the present embodiment is assembled in advance and then fitted into the rail member 50 is discussed. The overhang amount q (see FIG. 8) of both ends of the engaging portion of the joint block is the same as the first embodiment, so it is considered that catching is hardly occurs. However, since there is no relief of the bottom surface of the joint block, it is considered that there is a higher possibility that the end surface of the joint block will be caught as compared with the first embodiment.

Comparative Example

Comparative Example is, as Shown in FIG. 10A, an Example in which the length of the engaging portion 22 of each joint block 20 is the same as the total length of the joint block 20, and no relief portions is provided at both ends of the supported surface (bottom surface 20b) of the joint block 20 in the longitudinal direction.

Since this comparative example is the same as the first and second embodiments except for these points, detailed descriptions of the common portions are omitted.

FIG. 10B (a) is a partial cross-sectional view showing an assembly 202 using the joint block 20 of this embodiment. When two joint blocks 20, 20 are engaged with the rail member 50 and fastening bolts BT with the fluid device 110A are tightened, similarly to the first and second embodiments, fastening forces F of the fastening bolts BT and reaction forces of the gaskets 120 (equal to F) generate a moment that tries to rotate the respective joint block 20, 20 in opposite directions to each other, and this moment is applied to the rail member 50. In this comparative example, this moment is applied as an upward force W to the points A and D of the rail member 50 corresponding to the position of the outer ends of the bottom surfaces 20b of the joint blocks 20, and is applied as a downward force total of 2 W to the point G that is the position of the inner ends of the joint blocks 20 (center of the assembly).

With the action of these forces W, the joint blocks 20, 20 are locked with the rail member 50.

The deflection of the rail member 50 caused during this locking is discussed.

FIG. 10B (b) shows a model of deflection of a beam equivalent to the rail member 50 in FIG. 10B (a).

It is equivalent to a state in which a downward force 2 W is applied to the center of the beam and upward forces W are applied to respective ends of the beam.

Assuming that the length of each joint block 20 is l and the distance from the center to both ends is l, the deflection amount δ of the rail member 50 at both end positions of the joint blocks 20 is expressed by the following equation. (Equation 3 corresponds to the case where a=1 and b=0 in Equation 1.)

[Equation 3]

$$\delta = \frac{Wl^3}{3EI}. \quad (3)$$

Here, E is Young's modulus, and I is the second moment of cross section.

Accordingly, the deflection amount δ becomes $Wl^3/3EI$, that is greater than those in the first and second embodiments.

On the other hand, the fastening force F of the fastening bolt BT required to obtain the above W will be discussed.

Since the moment generated by the fastening force F of the fastening bolt and the reaction force of the gasket (equal to F) is equal to the moment applied to the rail member 50, if the distance between the fastening bolt BT and the center of the gasket 120 is s, a relation of F=Wl/s holds.

In the structure of this comparative example, for example, when s=0.23 and l=1, the fastening force F becomes about 4.17 W, which is larger than that of the first and second embodiments.

Next, in this comparative example, the assemble workability when the assembly of the joint block and the fluid device is assembled in advance and then fitted into the rail member 50 will be discussed. As described in the first embodiment, when the radius of curvature of the assembly is r and the length of the engaging portion is d, the overhang amount q of the end portion of each engaging portion (see FIG. 8) is approximated by $q=d^2/8r$. In this comparative example, since d=1, the overhang amount q becomes $q=1^2/8r$ that is greater than the overhang amount $q=0.16*1^2/8r$ in the first embodiment.

The results of the above discussions are summarized in the following table.

TABLE 1

Example of fastening force F and deflection amount δ when the locking force W is constant

| Construction | Unit. etc. | First Embodiment | Second embodiment | Comparative example (conventional) |
|---|---|---|---|---|
| Dimension (l) | Ratio to l | 1 | 1 | 1 |
| Dimension (a) | Ratio to l | 0.7 | 0.7 | 1 |
| Dimension (b) | Ratio to l | 0.15 | 0 | 0 |
| Dimension (s) | Ratio to l | 0.24 | 0.24 | 0.24 |
| Fastening force F | F = W (a − b)/s | | | |
| | Ratio of comparative example to W | 2.29 | 2.92 | 4.17 |
| Locking force W | W = Fs/(a − b) | | | |
| | Ratio to comparative example | 1 | 1 | 1 |
| Deflection amount δ | $\delta = \frac{W}{6EI}\{a^2(3l-a) - b^2(3l-b)\}$ | 0.53 | 0.56 | 1 |
| | Ratio to comparative example | | | |

Table 1 shows an example of the fastening force F and the deflection amount δ when the locking force W is kept constant.

In the first and second embodiments, the fastening force F required to obtain the required locking force W is reduced by 0.55 times and 0.7 times, respectively, and the deflection amount δ is reduced by 0.53 times and 0.56 times, respectively, as compared to the comparative example.

Therefore, the deflection amount δ can be greatly reduced if the torque of the fastening bolt BT is controlled to obtain the reduced fastening force F so that the required locking force W can be obtained.

TABLE 2

Example of locking force W and deflection amount δ when the fastening force F is constant

| Construction | Unit. etc. | First Embodiment | Second embodiment | Comparative example (conventional) |
|---|---|---|---|---|
| Dimension (l) | Ratio to l | 1 | 1 | 1 |
| Dimension (a) | Ratio to l | 0.7 | 0.7 | 1 |
| Dimension (b) | Ratio to l | 0.15 | 0 | 0 |
| Dimension (s) | Ratio to l | 0.24 | 0.24 | 0.24 |
| Fastening force F | F = W(a − b)/s | 4.17 | 4.17 | 4.17 |
| | Ratio of comparative example to W | | | |

TABLE 2-continued

Example of locking force W and deflection amount δ when the fastening force F is constant

| Construction | Unit. etc. | First Embodiment | Second embodiment | Comparative example (conventional) |
|---|---|---|---|---|
| Locking force W | $W = Fs/(a - b)$<br>Ratio to comparative example | 1.82 | 1.43 | 1 |
| Deflection amount δ | $\delta = \frac{W}{6EI}\{a^2(3l - a) - b^2(3l - b)\}$<br>Ratio to comparative example | 0.97 | 0.81 | 1 |

On the other hand, Table 2 shows an example of the locking force (W) and the deflection amount (δ) when the fastening force F is set to the same as the conventional one. In this case, the deflection amounts δ in the first and second embodiments become as small as 0.97 times and 0.81 times, respectively, as compared to the comparative example. On the other hand, the locking force (W) in the first and second embodiments increases to 1.82 times and 1.43 times, respectively, as compared to the comparative example.

From the above discussions, it is preferable to control the torque of the fastening bolt BT in order to obtain the reduced fastening force F so as to obtain the required locking force W, because the deflection amount δ can be significantly reduced.

The required locking force W and the torque of the fastening bolt BT that realizes the locking force may be obtained by calculation in consideration of the number and weight of the fluid device to be mounted, the orientation to be mounted (vertically or horizontally), etc., or may be obtained by experiment. Further, the effect of reducing the deflection amount (δ) can be expected even when the fastening force F is set to be the same as the conventional value without reducing the fastening force F.

TABLE 3

Assemble workability when assembling the assembly in advance and then fitting it into the rail member

| | First Embodiment | Second embodiment | Comparative example |
|---|---|---|---|
| Overhang amount q of the end of each engaging portion (Ratio when comparative example is 1) | 0.16 | 0.16 | 1 |
| Remarks | | Since there is no relief of the bottom surface of the joint block, it is more likely to be caught than in the first embodiment. | |

Table 3 shows the results of evaluating the assemble workability when the assembly is assembled in advance and then fitted into the rail member 50 by the overhang amount q of the end of the engaging portion 22. In the first and second embodiments, since the overhang amount q is reduced as compared with the comparative example, when the assembly is inserted into the rail member 50, it is less likely to be caught and the assemble workability is also improved.

In the above embodiments, the engaging surface 22f of the engaging portion 22 and the receiving surface 55f of the guide portion 55 are formed only as inclined surfaces, but as shown in FIG. 11A, the engaging portion 22_1 and the guide portion 55_1 can also be constituted by an inclined surface and a vertical surface. Further, as shown in FIGS. 11B and 11C, curved surfaces may be used for the engaging portions 22_2 and 22_3 and the guide portions 55_2 and 55_3. Further, as shown in FIGS. 12A and 12B, the engaging portions 22_4 and 22_5 may be concave, and the guide portions 55_4 and 55_5 may be convex.

In the above embodiments, cases of connecting joint block 20 and the body 113 with one fastening bolt BT have been described. However, if screw holes are present on the horizontal flow path 23c side of the flow path port 24a, it is also possible to use a plurality of fastening bolts BT.

REFERENCE SIGNS LIST

1: Fluid control device
10: Base plate
20: Joint block
20a: Upper surface
20b: Bottom surface
20c: Relief portion
21a-21d: Side surface
22: Engaging portion
22b: Bottom surface
22f: Engaging surface (alignment mechanism)
23: Fluid flow path
23a, 23b: Vertical flow path
23c: Horizontal flow path
24a, 24b: Flow path port
25a, 25b: Screw hole
26: Holding recess
30: Joint block
50: Rail member
55: Guide section
55f: Receiving surface (Alignment mechanism)
110A: Open-close valve (2-way valve) (fluid device)
110B: Regulator (fluid device)
110C: Pressure gauge (fluid device)
110D: Open-close valve (3-way valve) (fluid device)
110E: Mass flow controller (fluid device)
111: Actuator built-in portion
112: Valve built-in portion
113: Body
113a: Upper surface
113b: Bottom surface
114: Through hole
300: Joint member
310: Inlet pipe 320, 330: Communicating pipe
340: Supply pipe
400: Stopper
BTs, BT2: Fastening bolts
GP, GP1, GP2, GP3: Gap

The invention claimed is:

1. A fluid control device comprising:
upstream side and downstream side joint blocks each having an upper surface and a bottom surface facing each other and side surfaces extending from the upper surface to the bottom surface, the joint blocks each defining a fluid flow path, defining a flow path port of the fluid flow path which opens in the upper surface, and having an engaging portion at the bottom surface;
a support member that extends linearly in a longitudinal direction and has a guide portion to which the engaging portions of the upstream side and downstream side joint blocks are engageable; and
a fluid device supported by the support member via the upstream side and downstream side joint blocks;
wherein the guide portion restrains the upstream side and downstream side joint blocks on the support member while allowing the movement of the upstream side and downstream side joint blocks in a guiding direction,
the fluid device has a body defining a fluid flow path, and the body has a bottom surface at which two flow path ports open,
a first screw hole is formed toward the bottom surface from the upper surface of the upstream side joint block,
a second screw hole is formed toward the bottom surface from the upper surface of the downstream side joint block, the first and second screw holes are configured to be screwed with fastening bolts to connect the body to the upstream side and downstream side joint blocks while pressing seal members arranged around the flow path ports of the upstream side and downstream side joint blocks and the two flow path ports of the body, which are abutted against each other,
the first screw hole of the upstream side joint block is formed only on an upstream side of the flow path port of the upstream side joint block in the longitudinal direction,
the second screw hole of the downstream side joint block is formed only on a downstream side of the flow path port of the downstream joint block in the longitudinal direction,
the upstream side and downstream side joint blocks are fixed to the guide portion by utilizing a reaction force against a bending force to the upstream side and downstream side joint blocks and the body connected together generated by a tightening force of the fastening bolts, and
a length of the engaging portion in the longitudinal direction of the joint blocks is formed to be shorter than a length of the joint blocks.

2. The fluid control device according to claim 1, wherein the bottom surface of the joint block has a relief portion at one or both ends in the longitudinal direction.

3. A joint block, comprising:
an upper surface and a bottom surface facing each other,
side surfaces extending from the upper surface toward the bottom surface,
a fluid flow path including two flow path ports of the fluid flow path which open in the upper surface, and
an engaging portion on the bottom surface side,
wherein two screw holes, each of which is connectable with another member, are formed from the upper surface toward the bottom surface, the two screw holes are arranged between the two flow path ports in a longitudinal direction,
a length of the joint block in the longitudinal direction is formed longer than a length of the engaging portion in the longitudinal direction, and
a portion of the fluid flow path that connects the two flow path ports extends below bottoms of the two screw holes.

4. The joint block according to claim 3, wherein the bottom surface has a relief portion at one or both ends in the longitudinal direction.

5. A manufacturing method for a fluid control device,
the fluid control device comprising:
upstream side and downstream side joint blocks each defining an upper surface and a bottom surface facing each other, side surfaces extending from the upper surface toward the bottom surface, and a fluid flow path opened on the upper surface;
the upstream side and downstream side joint blocks each having an engaging portion on the bottom surface;
a support member that has a guide portion extending linearly in the longitudinal direction in which the engaging portions of the joint blocks are engageable, and restrains the joint blocks on the support member while allowing the joint blocks to move in the longitudinal direction by the guide portion; and
a fluid device having at least two flow path ports open on a bottom surface side and fixed to the upper surfaces of the joint blocks such that the flow path ports are connected to the fluid flow paths of the joint blocks,
the manufacturing method comprising:
forming a first screw hole toward the bottom surface from the upper surface of the upstream side joint block, and forming a second screw hole toward the bottom surface from the upper surface of the downstream side joint block, the first and second screw holes being configured to be screwed with fastening bolts to connect the fluid device to the upstream side and downstream side joint blocks while pressing seal members disposed around flow path ports of the upstream side and downstream joint blocks and the two flow path ports of the fluid device, which are butted against each other;
the first screw hole of the upstream side joint block being formed only on an upstream side of the flow path port of the upstream side joint block in the longitudinal direction;
the second screw hole of the downstream side joint block being formed only on a downstream side of the flow path port of the downstream side joint block in the longitudinal direction;
forming a length of the engaging portion shorter than a length of the joint block in the longitudinal direction; and
fixing the upstream side and downstream side joint blocks to the guide portion by utilizing a reaction force against a moment generated by a tightening force of the fastening bolts and acting on the upstream side and downstream side joint blocks and the fluid device connected together.

* * * * *